United States Patent
Lee et al.

(10) Patent No.: US 10,467,375 B2
(45) Date of Patent: Nov. 5, 2019

(54) METHODS AND SYSTEMS TO ESTIMATE POWER NETWORK NOISE

(71) Applicant: Taiwan Semiconductor Manufacturing Co., Ltd., Hsin-Chu (TW)

(72) Inventors: Hui Yu Lee, Hsin-Chu (TW); Hao-Tien Kan, Hsin-bei (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 78 days.

(21) Appl. No.: 15/697,206

(22) Filed: Sep. 6, 2017

(65) Prior Publication Data

US 2018/0165407 A1    Jun. 14, 2018

Related U.S. Application Data

(60) Provisional application No. 62/433,665, filed on Dec. 13, 2016.

(51) Int. Cl.
*G06F 17/50* (2006.01)

(52) U.S. Cl.
CPC ........ *G06F 17/5081* (2013.01); *G06F 17/509* (2013.01); *G06F 17/5027* (2013.01); *G06F 17/5036* (2013.01); *G06F 17/5072* (2013.01); *G06F 17/5045* (2013.01); *G06F 2217/78* (2013.01); *G06F 2217/82* (2013.01); *Y02E 60/76* (2013.01); *Y04S 40/22* (2013.01)

(58) Field of Classification Search
CPC ............... H02M 3/157; H02M 1/0845; H02M 3/33592; H03K 19/0963; H03K 19/215; H03K 23/40; G05F 3/262; G06F 1/24; G06F 1/26; G06F 17/5027; G06F 17/5036; G06F 17/5045; G06F 17/5072; G06F 17/5081; G06F 17/509; G06F 2217/78; G06F 2217/82
USPC .................................................. 716/118–129
See application file for complete search history.

(56) References Cited

U.S. PATENT DOCUMENTS

| | | | |
|---|---|---|---|
| 8,656,329 B1 * | 2/2014 | Kukal | G06F 17/5036 716/108 |
| 2012/0221988 A1 * | 8/2012 | Dai | G06F 17/5045 716/111 |
| 2012/0221990 A1 * | 8/2012 | Dai | G06F 17/5045 716/112 |

* cited by examiner

*Primary Examiner* — Binh C Tat
(74) *Attorney, Agent, or Firm* — Duane Morris LLP (57) ABSTRACT

A method includes providing a symbolic power distribution network (PDN) map for a PDN of an circuit design including at least a first mesh that includes a plurality of map nodes; modeling at least one parasitic component that is provided on a branch of the symbolic PDN map and a pair of current sources that are provided at two respective map nodes of the symbolic PDN map; providing a matrix equation based on an interrelated conduction behavior among the parasitic component and the pair of current sources, wherein the matrix equation includes a current source term representing the pair of current sources and an unknown variable term representing a voltage level of at least a map node of the symbolic PDN map; and based on the matrix equation, expanding the unknown variable term in a frequency-domain as a sum of plural mathematical components while keeping the current source term intact.

20 Claims, 4 Drawing Sheets

FIG. 4A $$C\dot{X}_n + GX_n = B$$

$$\underbrace{\begin{bmatrix} 0 & 0 & 0 & 0 & 0 \\ 0 & (C_c+C_1) & -C_c & 0 & 0 \\ 0 & -C_c & (C_c+C_1) & 0 & 0 \\ 0 & 0 & 0 & 0 & 0 \\ 0 & 0 & 0 & 0 & L_1 \end{bmatrix}}_{C} \underbrace{\begin{bmatrix} \dot{V}_1 \\ \dot{V}_2 \\ \dot{V}_3 \\ \dot{V}_4 \\ \dot{i}_L \end{bmatrix}}_{\dot{X}_n} + \underbrace{\begin{bmatrix} (G_1+G_4) & -G_1 & 0 & 0 & 0 \\ -G_1 & (G_1+G_4) & -G_2 & 0 & 0 \\ 0 & -G_2 & G_2 & 0 & 1 \\ 0 & 0 & 0 & (G_1+G_4) & -1 \\ 0 & 0 & -1 & 1 & 0 \end{bmatrix}}_{G} \underbrace{\begin{bmatrix} V_1 \\ V_2 \\ V_3 \\ V_4 \\ i_L \end{bmatrix}}_{X_n} = \underbrace{\begin{bmatrix} i_{S1} \\ 0 \\ 0 \\ i_{S2} \\ 0 \end{bmatrix}}_{B}$$

METHODS AND SYSTEMS TO ESTIMATE POWER NETWORK NOISE

CROSS-REFERENCE TO RELATED APPLICATION

The present application claims priority to U.S. Provisional Patent Application No. 62/433,665, filed on Dec. 13, 2016, which is incorporated by reference herein in its entirety.

BACKGROUND

A Power Distribution Network (hereinafter "PDN") delivers power and ground voltages from pad locations to all devices in an integrated circuit (hereinafter "IC"). In general, after a layout of the IC (and the PDN) is designed, various subsequent testing steps are typically performed to verify the layout design work. Conventional testing tools simulate the layout design by assuming that the PDN provides a constant voltage source to each circuit component (e.g., a transistor, etc.) of the IC. This approach is deficient because it does not account for various voltage drops that may occur across the PDN, which are typically referred to as power supply noise of the PDN.

During real operations of the IC, each of the circuit elements of the IC is associated with a voltage drop. Such a voltage drop may be due to various parasitic components (e.g., parasitic resistors, parasitic capacitors, parasitic inductors, etc.) across the PDN. In a non-limiting example, a parasitic resistor may be induced by a resistance of an interconnect wire that connects a power supply pad to a circuit component (e.g., a transistor) and a corresponding voltage drop may be equal to the resistance times a current flowing through the resistor. Moreover, due to rapid advances in semiconductor technology, today's IC can include millions of circuit components. A cumulative effect of respective voltage drops may lead to performance degradation or even critical failures of the IC. This is especially the case in low-power and high-performance IC's. If a supply voltage at a circuit component is decreased due to the voltage drop, the circuit component may not switch at a desired time, which may in turn cause malfunction of the circuit component and a corresponding larger circuit as a whole. Thus, there exists a need for method and system that can effectively, efficiently, and quickly perform a voltage drop analysis of the PDN for an IC design.

BRIEF DESCRIPTION OF THE DRAWINGS

Aspects of the present disclosure are best understood from the following detailed description when read with the accompanying figures. It is noted that various features are not necessarily drawn to scale. In fact, the dimensions of the various features may be arbitrarily increased or reduced for clarity of discussion.

DETAILED DESCRIPTION OF EXEMPLARY EMBODIMENTS

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

The present disclosure provides various embodiments of methods and systems to efficiently and accurately estimate power supply noise of a PDN of an IC design. As mentioned above, such power supply noise largely results from various voltage drops associated with respective circuit components of the IC design. In some embodiments, the disclosed systems and methods model each of various circuits of the IC design, and build a corresponding matrix equation that describes conduction behaviors of the IC design for estimating the voltage drops. More specifically, the disclosed systems and methods build the matrix equation to include the various circuits, and estimate the respective voltage drop associated with each circuit by splitting a term in the matrix equation that represents the various current sources when solving the matrix equation. As such, the voltage drop associated with each circuit can be efficiently and accurately estimated.

Figure 1:
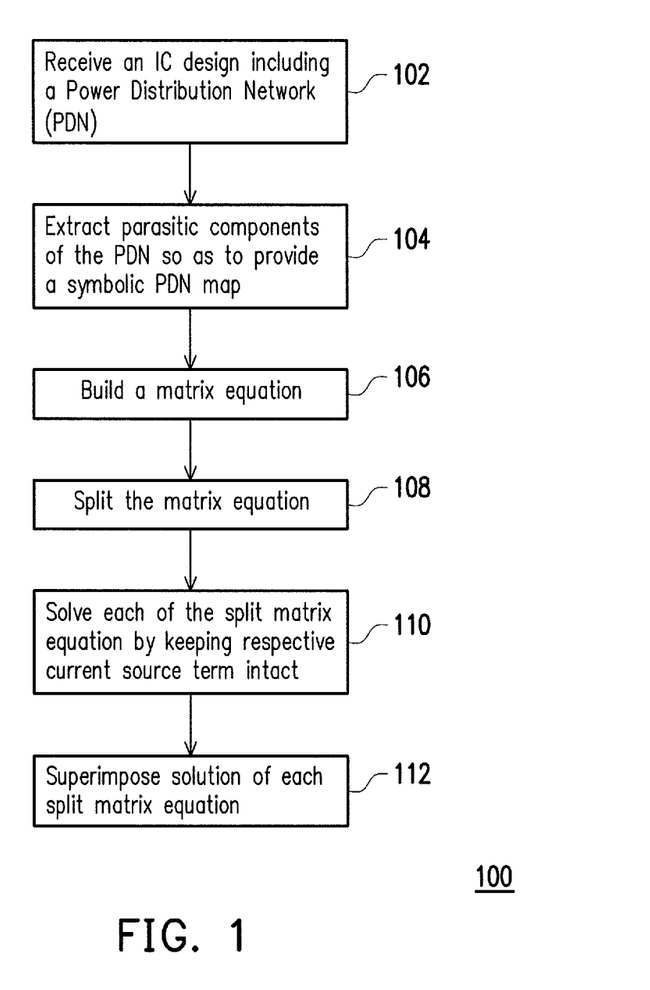
FIG. 1 illustrates an exemplary flow chart of a method to estimate power supply noise of a power distribution network (PDN) of an integrated circuit (IC) design, in accordance with some embodiments.

FIG. 1 illustrates an exemplary flow chart of a method to estimate plural voltage drops across a PDN of an IC design, in accordance with some embodiments. It is noted that the method 100 is merely an example, and is not intended to limit the present disclosure. Accordingly, it is understood that additional operations may be provided before, during, and after the method 100 of FIG. 1, and that some other operations may only be briefly described herein. In some embodiments, the IC design may include any of a variety of circuit designs coupled by a respective PDN design such as, for example, a system-on-chip (SoC) circuit design coupled by a PDN design, an application-specific integrated circuit (ASIC) design coupled by a PDN design, a circuit design from a semiconductor intellectual property core/library (IP core/library) coupled by a PDN design, etc.

In accordance with some embodiments of the present disclosure, the method 100 starts with operation 102 in which an IC design that includes plural circuits coupled by a PDN is received. The method 100 continues to operation 104 in which various parasitic components of the PDN are extracted so as to provide a symbolic PDN map that includes various parasitic components and current sources provided on respective map branches and at respective map nodes of the symbolic PDN map, respectively, wherein the current sources each represents a conduction behavior of a respective circuit. The method 100 continues to operation 106 in which a matrix equation that describes respectively interrelated conduction behaviors among the parasitic components of the PDN and the various current sources is provided, wherein the matrix equation includes voltage levels at respective map nodes of the symbolic PDN map as a solvable unknown term. The method 100 continues to operation 108 in which a matrix term in the matrix equation that represents various current sources is split into different current source terms each associated with the respective current source so various split matrix equations are provided, wherein each split matrix equation includes partial voltage levels at respective map nodes of the symbolic PDN map as a solvable unknown term. The method 100 continues to operation 110 in which each of the split matrix equation is solved by keeping the split current source term intact while expanding the respectively solvable unknown term as a Taylor series, in accordance with some embodiments. The method continues to operation 112 in which respective solutions of the split matrix equations are superimposed to calculate an overall voltage level at each map node of the symbolic PDN map so as to estimate various voltage drops across nodes of the PDN.

Operations of the method 100 may be associated with illustrated embodiments of an exemplary IC design at various simulation stages as shown in FIGS. 2-5, respectively. As mentioned above, in some embodiments, the IC design may include various circuits such as, for example, a microprocessor, a memory cell, and/or other circuits. In some alternative embodiments, the IC design may only include circuits that contribute significant voltage drops across the PDN, e.g., input/output (I/O) circuits. Also, it is noted that at least some of the figures described herein contain symbolic representations of functions to facilitate a better understanding of various concepts of the present disclosure.

Figure 2:
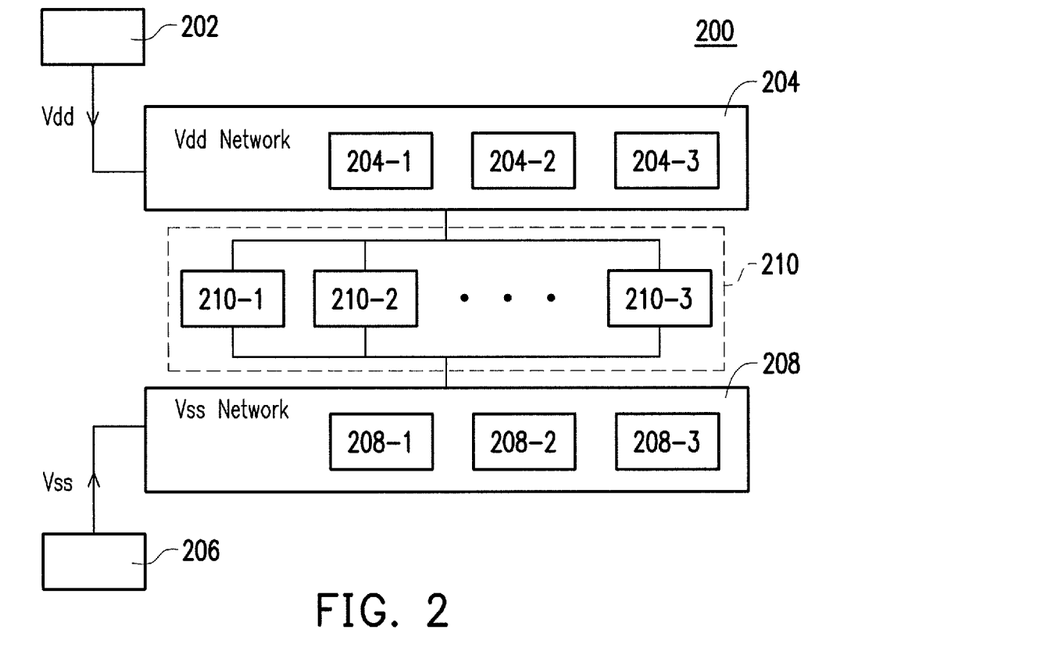
FIG. 2 illustrates an exemplary block diagram of the IC design of FIG. 1, in accordance with some embodiments.

Corresponding to operation 102, FIG. 2 illustrates an exemplary symbolic block diagram 200 of the IC design, in accordance with some embodiments. As shown in FIG. 2, the symbolic block diagram 200 includes a first power supply source 202 that is configured to provide a first supply voltage that is commonly a positive supply voltage (e.g., Vdd), a Vdd network 204 coupled to the first power supply source 202, a second power supply source 206 that is configured to provide a second supply voltage that is commonly a negative supply voltage or ground (e.g., Vss), a Vss network 208 coupled to the second power supply source 206, and a plurality of circuits 210 (e.g., 210-1, 210-2, 210-3, etc.) coupled between the Vdd network 204 and the Vss network 208. In some embodiments, the Vdd network 204 may be referred to as a positive supply voltage network, and the Vss network 208 may be referred to as a ground voltage network.

The Vdd network 204 is configured to deliver Vdd, received from the first power supply source 202, to each of the circuits (210-1, 210-2, 210-3, etc.), and the Vss network 208 is configured to deliver Vss, received from the second power supply source 206, to each of the circuits (210-1, 210-2, 210-3, etc.). More specifically, in some embodiments, the first and second power supply sources (202 and 206) may be each implemented by a battery, a voltage regulator, etc. Each of the circuits (210-1, 210-2, 210-3, etc.) may be implemented by one or more sets of interconnecting logic gates (e.g., AND gates, OR gates, etc.), memory components (e.g., flip-flops, etc.), transistors (e.g., MOSFET's, BTJ's, etc.), and/or conduction elements (e.g., resistors, capacitors, etc.). Although the symbolic block diagram 200 includes only three circuits coupled between the Vdd network 204 and the Vss network 208, it is understood the symbolic block diagram 200 may include any desired number of circuits while remaining within the scope of the present disclosure.

The Vdd network 204 and Vss network 208 may be collectively referred to as the PDN of the IC design 200. In some embodiments, the Vdd network 204 and Vss network 208 of such a PDN may each include plural power deliver blocks (204-1/208-1, 204-2/208-2, 204-3/208-3, etc.) that each performs a respective power deliver function. For example, the block 204-1/208-1 may represent one or more package layout designs (e.g., layout designs of fan-in, fan-out, PCB, and/or bump interconnection structures) that are configured to deliver the received Vdd/Vss through the interconnection structures; the block 204-2/208-2 may represent one or more inter-circuit signal path designs that are configured to deliver either Vdd or Vss from one circuit (210-1, 210-2, 210-3, etc.) to another circuit (210-1, 210-2, 210-3, etc.); and the block 204-3/208-3 may represent one or more die/chip layout designs that are configured to determine how Vdd or Vss is delivered to respective circuit components (e.g., transistors, resistors, capacitors, etc.) of a circuit (210-1, 210-2, 210-3, etc.) on a particular physical chip/die.

Figure 3:
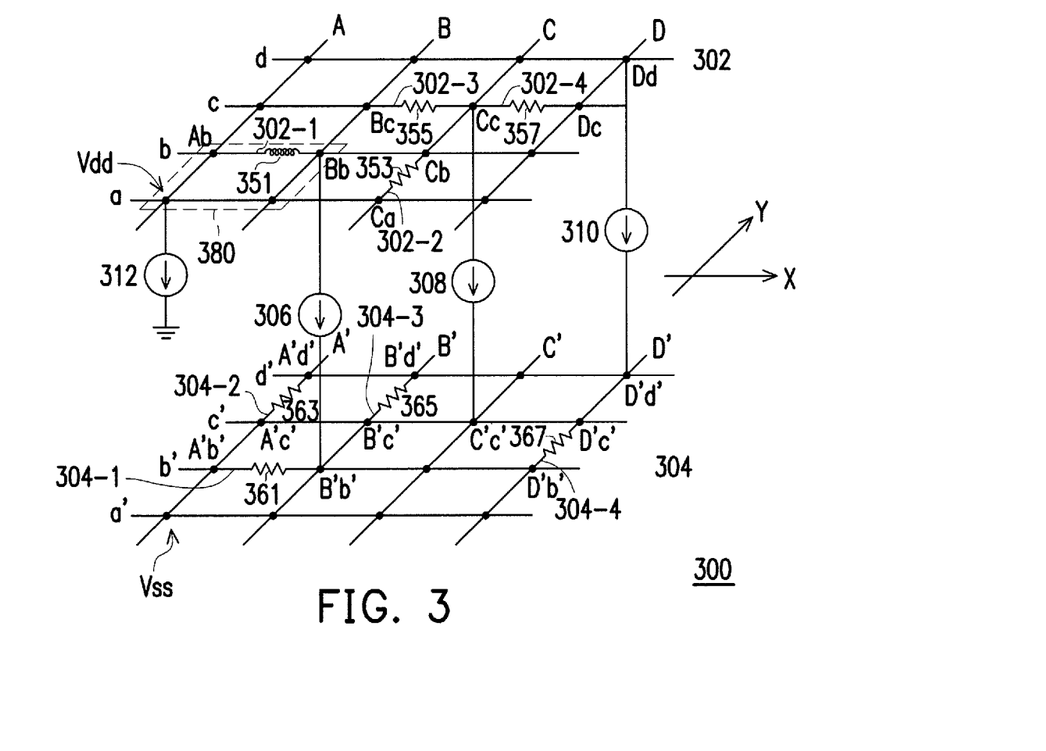
FIG. 3 illustrates an exemplary symbolic PDN map of the IC design of FIG. 2, in accordance with some embodiments.

Corresponding to operation 104, FIG. 3 illustrates an exemplary symbolic PDN map 300, in accordance with some embodiments. As shown in FIG. 3, such a symbolic PDN map 300 includes a first mesh 302, a second mesh 304, and a plurality of current sources (306, 308, and 310) coupled between the first and second meshes (302 and 304). In some embodiments, the symbolic PDN map 300 may be provided by inputting an IC design (e.g., 200) into one of various commercially available RC simulators such as, for example, StarRC (Synopsys of Mountain View, Calif.), QRC (Cadence Design Systems of San Jose, Calif.), and/or RedHawk (Ansys of Canonsburg, Pa.).

In the illustrated embodiment of the symbolic PDN map 300, the first mesh 302 may represent the Vdd network 204, the second mesh 304 may represent the Vss network 208, and the current sources (306, 308, and 310) may each represent one of the circuits (210-1, 210-2, 210-3). More specifically, when using at least one of the above-mentioned RC simulators to provide the symbolic PDN map 300, each of the meshes (302 and 304) may be modeled as a grid network that includes plural lines arranged along a first direction (e.g., the X-direction) and a second direction (e.g., the Y-direction), respectively, wherein each line may represent a power delivery path of the IC design 200. Moreover, each line extending along the first direction may intersect with one or more lines extending along the second direction at one or more map nodes, and similarly, each line extending along the second direction may intersect with one or more lines extending along the first direction at one or more map nodes, wherein each map node may represent a node in the IC design 200 that is configured to be coupled to a circuit element, a voltage supply, etc., which will be discussed in further detail below.

For example, the first mesh 302 includes lines ("a," "b," "c," and "d") extending along the X-direction, and lines ("A," "B," "C," and "D") extending along the Y-direction; and the second mesh 304 includes lines ("a'," "b'," "c'," and "d'") extending along the X-direction, and lines ("A'," "B'," "C'," and "D'") extending along the Y-direction. Since each map node in either the first mesh 302 or second mesh 304 is at an intersection of two respective lines, each map node is hereinafter referred to by a combination of labels of respective intersecting lines. As some representative examples, line B intersect with line b at map node "Bb;" line C intersects with line c at map node "Cc;" line D intersects with line d at map node "Dd;" line B' intersect with line b' at map node "B'b';" line C' intersects with line c' at map node "C'c';" and line D' intersects with line d' at map node "D'd'." Still more specifically, when the symbolic PDN map 300 is provided, respective parasitic components (e.g., e.g., parasitic resistors, parasitic capacitors, parasitic inductors, etc.) that, in some embodiments, result from the power delivery blocks (204-1 to 204-3) and (208-1 to 208-3) in the Vdd network 204 and the Vss network 208, respectively, can be extracted and mapped to corresponding branches (302-1, 302-2, 302-3, 302-4, 304-1, 304-2, 304-3, 304-4, etc.). The term branch as used herein is referred to as a section of a line (lines A to D, lines a to d, lines A' to D', and lines a' to d') that connects two adjacent map nodes in the symbolic PDN map 300.

For example, in the first mesh 302, parasitic inductor 351 that results from at least one of the power delivery blocks (204-1 to 204-3) is mapped to the branch 302-1 that connects map nodes Ab and Bb; parasitic resistor 353 that results from at least one of the power delivery blocks (204-1 to 204-3) is mapped to the branch 302-2 that connects map nodes Ca and Cb; parasitic resistor 355 that results from at least one of the power delivery blocks (204-1 to 204-3) is mapped to the branch 302-3 that connects map nodes Bc and Cc; and parasitic resistor 357 that results from at least one of the power delivery blocks (204-1 to 204-3) is mapped to the branch 302-4 that connects map nodes Cc and Dc. In the second mesh 304, parasitic resistor 361 that results from at least one of the power delivery blocks (208-1 to 208-3) is mapped to the branch 304-1 that connects map nodes A'b' and B'b'; parasitic resistor 363 that results from at least one of the power delivery blocks (208-1 to 208-3) is mapped to the branch 304-2 that connects map nodes A'c' and A'd'; parasitic resistor 365 that results from at least one of the power delivery blocks (208-1 to 208-3) is mapped to the branch 304-3 that connects map nodes B'c' and B'd'; and parasitic resistor 367 that results from at least one of the power delivery blocks (208-1 to 208-3) is mapped to the branch 304-4 that connects map nodes D'c' and D'd'.

As mentioned above, each map node in the symbolic PDN map 300 may represent a respective node in the IC design 200 that is configured to be coupled to a circuit element, a voltage supply, etc. Still more specifically, when the symbolic PDN map 300 is provided, the node in the first mesh 302 where the Vdd is received may be identified, the node in the second mesh 304 where the Vss is received may be identified, and each current source (306, 308, and 310) that represents the circuit (210-1, 210-2, 210-3, etc.) may be provided as a model at respective nodes in the first and second meshes 302 and 304, respectively, according to the IC design 200. As such, based on the IC design 200, a power delivery path of either Vdd or Vss to a particular circuit at a respective node that is represented by a respective current source (306, 308, or 310) can also be identified in the symbolic PDN map 300. In some embodiments, the node where the Vdd is received (i.e., map node Aa) may be modeled as being coupled to a current source 312, which will be discussed in further detail below with respect to FIGS. 4A and 4B.

For example, based on the IC design 200, the circuit represented by the current source 306 may be modeled to couple between map nodes "Bb" and "B'b'" in the symbolic PDN map 300; the circuit represented by the current source 308 may be modeled to couple between map nodes "Cc" and "C'c'" in the symbolic PDN map 300; the circuit represented by the current source 310 may be modeled to couple between map nodes "Dd" and "D'd'" in the symbolic PDN map 300. Also, the Vdd may be modeled to couple at map node "Aa," and the Vss may be modeled to couple at map node "A'a'."

Ideally, when a PDN includes no parasitic components, each of map nodes of a corresponding symbolic PDN map can receive 100% of the Vdd or Vss since no voltage drops are present across such non-existing parasitic components. Referring again to FIG. 2, however, in some embodiments, a PDN (i.e., the Vdd network 204/Vss network 208) generally includes various parasitic components that result from respective power delivery blocks (e.g., 204-1 to 204-3, 208-1 to 208-3, etc.). Each parasitic component may contribute a respective amount of voltage drop. Also, the voltage drops caused by various parasitic components across the PDN may be interrelated with one another. Thus, a voltage level at each node of the Vdd network 204/Vss network 208 of the IC design 200 may be a function of a collective effect of plural parasitic components (across the power delivery blocks 204-1 to 204-3, 208-1 to 208-3, etc.), the circuits (210-1 to 210-3, etc.), and the Vdd/Vss. By estimating the voltage levels at the nodes across the Vdd network 204/Vss network 208, the power supply noise of the PDN can be accurately modeled and estimated. In other words, a user (e.g., a manufacturer, a vender, a consumer of the memory circuit, etc.) of the IC design 200 may be aware which node across the Vdd network 204/Vss network 208 may suffer a significant amount of voltage drop (i.e., a relatively small fraction of the Vdd/Vss).

Figure 4A:
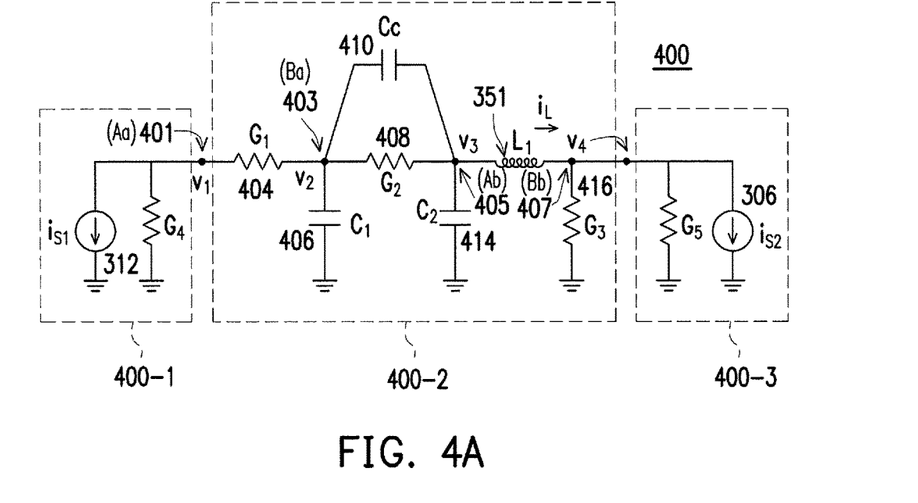
FIG. 4A illustrates an exemplary equivalent circuit diagram of a portion of the symbolic PDN map of FIG. 3, in accordance with some embodiments.
Figure 4B:
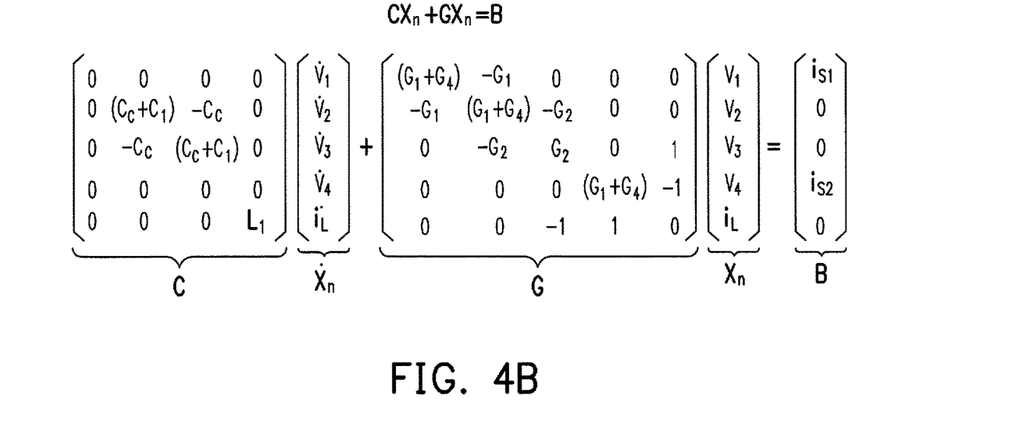
FIG. 4B illustrates an exemplary matrix equation corresponding to the equivalent circuit diagram of FIG. 4A, in accordance with some embodiments.

In accordance with various embodiments of the present disclosure, once the parasitic components and current sources (representing the circuits of the IC design 200) are modeled at respective branches and map nodes of the symbolic PDN map 300 (FIG. 3), a matrix equation with solvable unknown variables that each represents a "practically received" supply voltage at the node of the symbolic PDN map 300 (i.e., the voltage level at each node of the Vdd network 204/Vss network 208) may be readily available based on Kirchhoff's current law (KCL) and Kirchhoff's voltage law (KVL), which will be discussed in further detail below with respect to FIGS. 4A and 4B.

FIG. 4A illustrates an equivalent circuit diagram 400 of a portion 380 of the symbolic PDN map 300 of FIG. 3, and FIG. 4B illustrates an exemplary matrix equation 450 that describes respectively interrelated conduction behaviors among the portion 380's parasitic components, current sources, and unknown variables. The equivalent circuit diagram 400, in some embodiments, may be readily available by translating the extracted parasitic components and other information (e.g., where the Vdd is received, where the current source is coupled, etc.) provided in operation 104 of FIG. 1, and the matrix equation 450 is built based on the equivalent diagram 400, which will be discussed in further detail below.

It is noted that the symbolic PDN map 300 shown in FIG. 3 are simplified for purposes of illustration. Accordingly, in some embodiments, the portion 380 shown in FIG. 3 may not include all extracted parasitic components (provided in operation 104). In some embodiments, the equivalent circuit diagram 400 of FIG. 4A may be converted from a more "practical" version of the portion 380, which may include all the extracted parasitic components (provided in operation 104).

Referring to FIG. 4A, the equivalent circuit diagram 400 include three parts: part 400-1 that is used to model the Vdd, part 400-2 that equivalently represents various parasitic components of the portion 380, and part 400-3 that is used to model the current source 306. More specifically, in some embodiments, the part 400-1 includes the current source 312 coupled to node 401 (corresponding to map node Aa in the symbolic PDN map 300), wherein, as mentioned above, in some embodiments, the current source 312 may be used to model an ideal Vdd source, i.e., 100% Vdd is modeled as receiving at node 401 (map node Aa). The current source 312 may be modeled as providing a constant current level of $i_{s1}$ so that a voltage level (i.e., $v_1$) at node 401 (map node Aa in FIG. 3) may be about the same of the Vdd. Alternatively stated, the node 401 corresponds to node Aa in FIG. 3 that receives 100% Vdd. In some embodiments, the part 400-1 may further include a resistor with a conductance value of $G_4$ that is coupled to the current source 312 in parallel.

The part 400-2 includes plural parasitic components of the portion 380, which are partially shown in FIG. 3, such as, for example, a first resistor 404 with a conductance value of $G_1$; a first capacitor 406 with a capacitance value of $C_1$; a second resistor 408 with a conductance value of $G_2$; a second capacitor 410 with a capacitance value of $C_c$; the inductor 351 with an inductance value of $L_1$; a third capacitor 414 with a capacitance value of $C_2$; and a third resistor 416 with a conductance value of $G_3$. Moreover, the first resistor 404 may be coupled between nodes 401 (map node Aa) and 403 (corresponding to map node Ba); the first capacitor 406 may be coupled between node 403 (map node Ba) and ground; the second capacitor 410 and second resistor 408 may be coupled between nodes 403 (map node Ba) and 405 (corresponding to map node Ab); the third capacitor 414 may be coupled between node 405 (map node Ab) and ground; the inductor 351, as also shown in FIG. 3, may be coupled between nodes 405 (map node Ab) and 407 (map node Bb); and the third resistor 416 may be coupled between node 407 (map node Bb) and ground, wherein voltage levels at nodes 403, 405, and 407 may be $v_2$, $v_3$, and $v_4$, respectively, and a current level flowing through the inductor 351 may be $i_L$.

As mentioned above, the part 400-3 is used to model the current source 306. Accordingly, the part 400-3 includes the current source 306 coupled to node 407. In some embodiments, the current source 306 may be modeled as providing a constant current $i_{s2}$ so that a voltage level (i.e., $v_4$) at node 407 may be determined based on the plural parasitic components (351, 404, 406, 408, 410, 414, and 416). In some alternative embodiments, the current $i_{s2}$ provided by the current source 306 may be modeled as a time-varying current $i_{s2}$. In some embodiments, the part 400-3 may further include a resistor with a conductance value of $G_5$ that is coupled to the current source 306 in parallel.

As mentioned above, in some embodiments, the equivalent circuit diagram 400 is converted from the portion 380 (FIG. 3) that is provided by using one of various commercially available RC simulators. Thus, each node of the equivalent circuit diagram 400 may correspond to a respective map node of the symbolic PDN map 300, as described above, and moreover, the respective values of the parasitic components are known. That is, the conductance values $G_1$, $G_2$, $G_3$, $G_4$, and $G_5$, the capacitance values $C_1$, $C_C$, and $C_2$, and the inductance value $L_1$ are known. Additionally, in some embodiments, the current source 312 is used to model the ideal Vdd source map node Aa of the symbolic PDN map 300 (FIG. 3), wherein map node Aa corresponds to the node 401 in the equivalent circuit diagram 400, and the current source 306 of the symbolic PDN map 300 is mapped to the equivalent circuit diagram 400 to be coupled at node 407. As such, the equivalent circuit diagram 400 may equivalently represent one or more conduction behaviors (e.g., a Vdd power delivery path) within the portion 380 of the symbolic PDN map 300.

In some embodiments, based on such equivalent circuit diagram 400, the matrix equation 450 (FIG. 4B) with an unknown variable twin ($v_1$, $v_2$, $v_3$, $v_4$, and $i_L$) that include voltage levels at plural nodes ($v_1$, $v_2$, $v_3$, and $v_4$) in the portion 380 can be derived by using KCL and KVL. In some embodiments, each of the unknown variables ($v_1$, $v_2$, $v_3$, $v_4$, and $i_L$) may be time-varying, i.e., a function of time.

More specifically, in some embodiments, the matrix equation 450 is derived as a differential equation, $CX'_n + GX_n = B$ (also shown in FIG. 4B), wherein $X_n$ represents the unknown variable term, $X'_n$ represents a first-order derivative of the unknown variable term, C represents a first known term that results from parasitic capacitor(s) and inductor(s) (e.g., 351, 406, 410, and 414), G represents a second known term that results from parasitic resistor(s) (e.g., 404, 408, and 416), and B represents a third known term that results from a pair of current sources coupled to the portion 380 (e.g., 306 and 312) and at least an additional current/voltage source, if available.

It is noted that the above discussions are provided for explanation of a principle to convert the symbolic PDN map 300 to an equivalent matrix equation, and thus directed to solving voltage levels at map nodes within a portion of the first mesh 302 of the symbolic PDN map 300. In order to accurately estimate the power supply noise across the PDN (i.e., estimating the voltage levels at all map nodes across the symbolic PDN map 300), a "collective" effect from various extracted parasitic components and current sources across the symbolic PDN map 300 is typically considered, in accordance with some embodiments. More specifically, in some embodiments, the voltage levels at the map nodes of the first and second meshes 302 and 304 are estimated separately. Alternatively stated, the voltage level at each of the map nodes of the first mesh 302 may be a fraction of the Vdd, and the voltage level at each of the map nodes of the second mesh 304 may be a fraction of the Vss. Thus, when using the above-described principle to convert the symbolic PDN map 300 to the equivalent matrix equation, the equivalent matrix equation may be either a Vdd matrix equation configured to solve the voltage levels at the map nodes of the first mesh 302, or a Vss matrix equation configured to solve the voltage levels at the map nodes of the second mesh 304. Since building and solving the Vdd and Vss matrix equations, for brevity, the following discussions will be directed to the Vdd matrix equation.

Corresponding to operation 106, by using the above-described principle, the Vdd matrix equation that takes into account all extracted parasitic resistors/capacitors/inductors and current sources (operation 104) of the symbolic PDN map 300 may be derived. In some embodiments, the Vdd matrix equation may be substantially similar to 450 of FIG. 4B, $C_{302}X'_{302} + G_{302}X_{302} = B_{302}$ wherein the "$C_{302}$" term represents all the parasitic capacitor/inductors across the first mesh 302; the "$G_{302}$" term represents all the parasitic resistors across the first mesh 302; the "$B_{302}$" term represents all the current/voltage sources (e.g., 306, 308, 310, etc.) coupled to the first mesh 302; the "$X_{302}$" term represents unknown voltage/current levels at all the nodes across the first mesh 302; and the $X'_{302}$ represents a first-order derivative of the $X_{302}$ term. In some embodiments, the "$B_{302}$" term may include six columns (due to the consideration of all three current sources of the symbolic PDN map 300), and a first pair of columns of the $B_{302}$ term is associated with the current source 306 and the ideal Vdd source 312 (FIG. 4A), a second pair of columns of the $B_{302}$ term is associated with the current source 308 and the ideal Vdd source 312 (FIG. 4A), and a third pair of columns of the $B_{302}$ term is associated with the current source 310 and the ideal Vdd source 312 (FIG. 4A).

Accordingly, corresponding to operation 108 of FIG. 1, the Vdd matrix equation may be split into three split matrix equations, $$C_{302}\dot{X}_1 + G_{302}X_1 = B1$$

$$C_{302}\dot{X}_2 + G_{302}X_2 = B2$$

$$C_{302}\dot{X}_3 + G_{302}X_3 = B3,$$

where B1 represents the first pair of columns of the $B_{302}$ term that is associated with the current source 306, the $X_1$ term represents a fraction of the voltage/current level at each of the map nodes across all the first mesh 302 when taking into account the current source 306, the $\dot{X}_1$ term represents a first-order derivative of the $X_1$ term, B2 represents the second pair of columns of the $B_{302}$ term that is associated with the current source 308, the $X_2$ term represents a fraction of the voltage/current level at each of the map nodes across all the first mesh 302 when taking into account the second current source 308, the $\dot{X}_2$ term represents a first-order derivative of the $X_2$ term, B3 represents the third pair of columns of the $B_{302}$ term that is associated with the current source 310, the $X_3$ term represents a fraction of voltage/current level at each of the map nodes across the first mesh 302 when taking into account the current source 310, and the $\dot{X}_3$ term represents a first-order derivative of the $X_3$ term.

Corresponding to operation 110 of FIG. 1, each of the split matrix equation is solved by keeping the respective "B" term (e.g., $B_1$, $B_2$, $B_3$) intact while performing a Taylor series expansion. More specifically, while solving the split matrix equations, each of the split matrix equations is converted from a time-domain to a frequency-domain through a Laplace transform:

$$sC_{302}X_1 + G_{302}X_1 = B1$$

$$sC_{302}X_2 + G_{302}X_2 = B2$$

$$sC_{302}X_3 + G_{302}X_3 = B3,$$

where s represents a complex variable in the Laplace transform.

By further processing the converted matrix equations in the frequency-domain, each of the unknown variable terms ($X_1$, $X_2$, and $X_3$) may be represented as:

$$X_1(s) = (1 + sG_{302}^{-1}C_{302}^{-1})^{-1}G_{302}^{-1}B1$$

$$X_2(s) = (1 + sG_{302}^{-1}C_{302}^{-1})^{-1}G_{302}^{-1}B2$$

$$X_3(s) = (1 + sG_{302}^{-1}C_{302}^{-1})^{-1}G_{302}^{-1}B3$$

By using a Taylor series to expand each of the unknown variable terms ($X_1$, $X_2$, and $X_3$) as an infinite sum of respective Taylor components but keeping the respective "B" term intact, the unknown variable terms ($X_1$, $X_2$, and $X_3$) may be represented as:

$$X_1(s) = (m_0 + m_1 s + m_2 s^2 + \ldots)B1$$

$$X_2(s) = (m_0 + m_1 s + m_2 s^2 + \ldots)B2$$

$$X_3(s) = (m_0 + m_1 s + m_2 s^2 + \ldots)B3,$$

where $m_0$, $m_1$, and $m_2$ represent Taylor series coefficients for respective Taylor components (e.g., 1, s, $s^2$, etc.). It is understood by people of ordinary skill in the art that such a Taylor series expansion is known in the art so that further discussions about the Taylor series expansion are omitted.

In some embodiments, after being expanded as the respective Taylor series, the unknown variable terms ($X_1$, $X_2$, and $X_3$) may be each derived by using any of a variety of mathematical approximation methods, for example, an Asymptotic Waveform Evaluation (AWE) method. The AWE method is a general method for computing a qth order approximate model of a circuit or system, and can be obtained by computing 2 g moments of the circuit or system and matching these moments to the circuit's or system's impulse response (e.g., the "B1, B3, B3" terms). The moments, in their simplest interpretation, represent the coefficients of the powers of s in the Taylor series expansion of the homogeneous circuit response. Once the desired number of moments is found, they may be mapped to the approximate dominant poles of the lower order approximating system. The corresponding residues are then computed using the poles and moments. For example, using the AWE method, the unknown variable terms ($X_1$, $X_2$, and $X_3$) may be each represented as a fraction consisting a numerator polynomial series and a denominator polynomial series:

$$X_1(s) = \frac{b_0 + b_1 s + b_2 s^2 + b_3 s^3}{1 + a_1 s + a_2 s^2 + a_3 s^3 + a_4 s^4}B1$$

$$X_2(s) = \frac{b_0 + b_1 s + b_2 s^2 + b_3 s^3}{1 + a_1 s + a_2 s^2 + a_3 s^3 + a_4 s^4}B2$$

$$X_3(s) = \frac{b_0 + b_1 s + b_2 s^2 + b_3 s^3}{1 + a_1 s + a_2 s^2 + a_3 s^3 + a_4 s^4}B3,$$

where $a_1$, $a_2$, $a_3$, $a_4$, $b_0$, $b_1$, $b_2$, and $b_3$ represent the moments described above.

Once the unknown variable terms ($X_1$, $X_2$, and $X_3$) in the frequency-domain are each approximated by the AWE method as shown above, the unknown variables ($X_1$, $X_2$, and $X_3$) in the time-domain may be each derived by performing at least an inverse Laplace transform known in the art. Accordingly, each of the unknown variables ($X_1$, $X_2$, and $X_3$) in the time-domain is solved so that the voltage levels at each of the nodes across all the Vdd routes when taking into account the respective current source are available.

Then corresponding to operation 112, the solved unknown variable terms ($X_1$, $X_2$, and $X_3$), now becoming solved variables ($X_1$, $X_2$, and $X_3$), are superimposed. As mentioned above, each of the solved variables ($X_1$, $X_2$, and $X_3$) represent a fraction of the voltage level at each of the map nodes across the first mesh 302 when only taking into account the respective current source so that through the superimposition, the voltage level of each of the map nodes across the first mesh 302 can be calculated. Accordingly, the voltage drop at each map node can be calculated, i.e., Vdd—the respectively calculated voltage level, which allows the voltage drops at each node across the Vdd network 204 to be estimated accurately. As mentioned above, the above-described approach can be used to estimate the voltage drops across the Vss network 208 so that the power supply noise of the PDN (i.e., the Vdd network 204 and the Vss network 208) can be estimated accurately.

For example, referring again to the IC design 200 of FIG. 2, each of the power deliver blocks 204-1, 204-2, 204-3, 208-1, 208-2, and 208-3 in the PDN of the IC design 200 may induce one or more parasitic components, which may each cause a voltage drop across the PDN. By using the method 100 of FIG. 1, respective values of such voltage drops can be accurately estimated, and moreover, respective locations of such voltage drops (e.g., at which map node of the corresponding symbolic PDN map) can be accurately modeled as well. As such, when the IC design 200 is provided, one or more power deliver blocks (e.g., 204-1, 204-2, 204-3, 208-1, 208-2, and 208-3) in the IC design 200 that may cause an intolerable voltages drop can be accurately pinpointed, which may be further modified or removed. More specifically, since a corresponding matrix equation is split and each split matrix is solved respectively in the operations 108 and 110 of the method 100, respectively, the voltage drops caused at respective different locations of across the PDN can be estimated in parallel, which substantially reduces corresponding calculation time.

Further, in some embodiments, when using the method 100, the voltage drops at respective map nodes of the symbolic PDN map (e.g., 300) are correlated. For example, in FIG. 3, the voltage drop at the map node Aa may be twice larger than the voltage drop at the map node Ab. In some embodiments, such a coefficient between voltage drops at different map nodes may be independent of which current/voltage sources (e.g., 306, 308, 310, etc.) are included in the symbolic PDN map 300, i.e., the coefficients between voltage drops at different map nodes may remain unchanged when different current/voltage sources (e.g., 306, 308, 310, etc.) are coupled between the first and second meshes 302 and 304. As such, when the first mesh 302 and second mesh 304, which correspond to the PDN (204 and 208), are used by another circuit design (different from 210), the voltage drops across the PDN can be quickly estimated (e.g., predicted).

Figure 5:
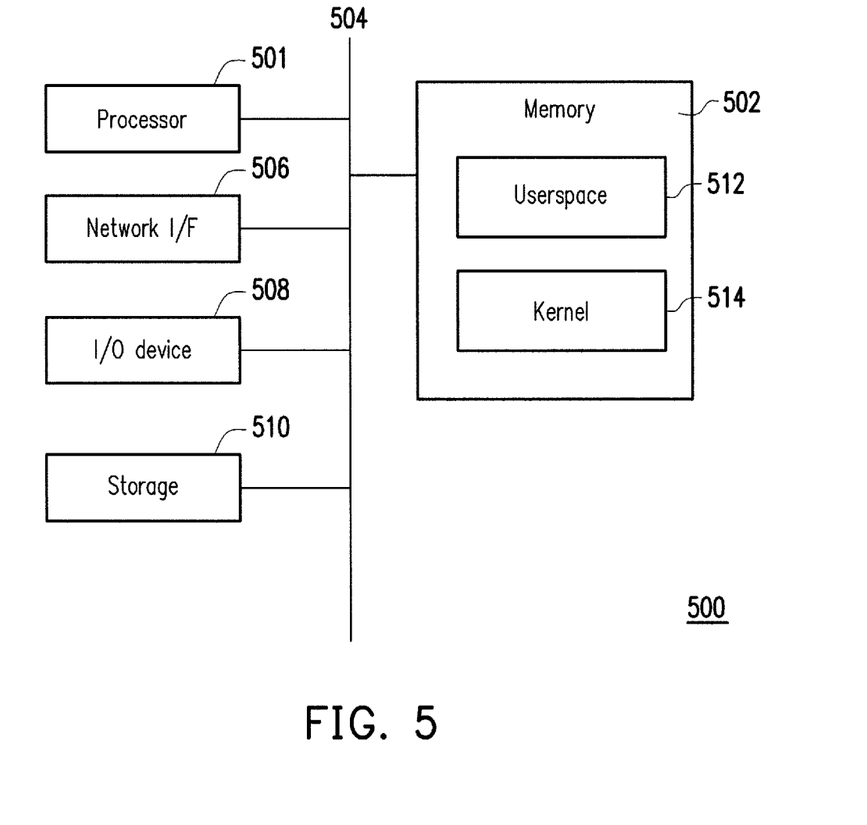
FIG. 5 illustrates a block diagram of a computer system to perform the method of FIG. 1, in accordance with some embodiments.

FIG. 5 is a block diagram of a computer system 500 in accordance with some embodiments. One or more of the tools and/or engines and/or systems and/or operations described with respect to FIGS. 1-4B is realized in some embodiments by one or more computer systems 500 of FIG. 5. The system 500 comprises at least one processor 501, a memory 502, a network interface (I/F) 506, an input/output (I/O) device 508, and a storage 510 communicatively coupled via a bus 504 or other interconnection communication mechanism.

The memory 502 comprises, in some embodiments, a random access memory (RAM) and/or other dynamic storage device and/or read only memory (ROM) and/or other static storage device, coupled to the bus 504 for storing data and/or instructions to be executed by the processor 501. The memory 502 can further include a userspace 512, kernel 514, portions of the kernel and/or the userspace, and components thereof. The memory 502 is also used, in some embodiments, for storing temporary variables or other intermediate information during execution of instructions to be executed by the processor 501. In various embodiments, the memory 502 can be contained within a single integrated circuit or comprise a plurality of discrete memory devices operatively coupled to one another.

In some embodiments, a storage device 510, such as a magnetic disk or optical disk, is coupled to the bus 504 for storing data and/or instructions. The I/O device 508 comprises an input device, an output device and/or a combined input/output device for enabling user interaction with the system 500. An input device comprises, for example, a keyboard, keypad, mouse, trackball, trackpad, and/or cursor direction keys for communicating information and commands to the processor 501. An output device comprises, for example, a display, a printer, a voice synthesizer, etc. for communicating information to a user.

In some embodiments, one or more operations and/or functionality of the tools and/or engines and/or systems described with respect to FIGS. 1-4B are realized by the processor 501, which is programmed for performing such operations and/or functionality. In some embodiments, the processor 501 is configured as specifically configured hardware (e.g., one or more application specific integrated circuits (ASICs)). In accordance with various embodiments, the processor 501 may be implemented within a single integrated circuit (IC) or as multiple communicatively coupled IC's and/or discrete circuits. It is appreciated that the processor 501 can be implemented in accordance with various known technologies. In one embodiment, the processor 501 includes one or more circuits or units configurable to perform one or more functions or processes described herein by executing instructions stored in an associated memory, for example. In other embodiments, the processor 501 may be implemented as firmware (e.g., discrete logic components) configured to perform one or more functions or processes described herein. For example, in accordance with various embodiments, the processor 501 may include one or more controllers, microprocessors, microcontrollers, application specific integrated circuits (ASICs), digital signal processors, programmable logic devices, field programmable gate arrays, or any combination of these devices or structures, or other known devices and structures, to perform the functions described herein.

One or more of the memory 502, the I/F 506, the storage 510, the I/O device 508, and the bus 504 is/are operable to receive instructions, data, design constraints, design rules, netlists, layouts, models and/or other parameters for processing by the processor 501.

In some embodiments, the operations and/or functionality are realized as functions of a program stored in a non-transitory computer readable recording medium. In at least one embodiment, the operations and/or functionality are realized as functions of a program, such as a set of executable instructions, stored in memory 502. In at least one embodiment, an IC design, such as the IC design 200 (FIG. 2), is stored in a non-transitory computer readable recording medium for access by one or more operations as described herein. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

In an embodiment, a method for estimating power supply noise of a power distribution network (PDN) of a circuit design includes providing a symbolic PDN map including at least a first mesh that includes a plurality of map nodes, wherein each map node of the first mesh corresponds to a node of the circuit design; modeling at least one parasitic component that is provided on a branch of the symbolic PDN map and a pair of current sources that are provided at two respective map nodes of the symbolic PDN map; providing a matrix equation based on an interrelated conduction behavior among the parasitic component and the pair of current sources, wherein the matrix equation includes a current source term representing the pair of current sources and an unknown variable term representing a voltage level of at least a map node of the symbolic PDN map; and based on the matrix equation, expanding the unknown variable term in a frequency-domain as a sum of plural mathematical components while keeping the current source term intact.

In another embodiment, a system for estimating power supply noise of a power distribution network (PDN) of a circuit design includes a memory storing computer-executable instructions and one or more hardware processors coupled to the memory. The one or more hardware processors are configured to provide a symbolic PDN map including at least a first mesh that includes a plurality of map nodes, wherein each map node of the first mesh corresponds to a node of the circuit design; model at least one parasitic component that is provided on a branch of the symbolic PDN map and a pair of current sources that are provided at two respective map nodes of the symbolic PDN map; provide a matrix equation based on an interrelated conduction behavior among the parasitic component and the pair of current sources, wherein the matrix equation includes a current source term representing the pair of current sources and an unknown variable term representing a voltage level of at least a map node of the symbolic PDN map; and based on the matrix equation, expand the unknown variable term in a frequency-domain as a sum of plural mathematical components while keeping the current source term intact.

Yet in another embodiment, a method for estimating power supply noise of a power distribution network (PDN) of a circuit design includes providing a symbolic PDN map including at least a first mesh that includes a plurality of map nodes, wherein each map node of the first mesh corresponds to a node of the circuit design; modeling at least one parasitic component that is provided on a branch of the symbolic PDN map, and first, second, and third current sources that are respectively provided at three different map nodes of the symbolic PDN map; providing a matrix equation based on an interrelated conduction behavior among the parasitic component and the first, second, and third current sources, wherein the matrix equation includes an unknown variable term representing a voltage level of at least a map node of the symbolic PDN map, and a current source term comprising representing the first, second, and third current sources; splitting the current source term into two sub current source terms thereby proving two sub matrix equations with a respective unknown variable term; and based on the respective sub matrix equations, expanding the respective unknown variable terms in a frequency-domain as a first sum of plural mathematical components and a second sum of plural mathematical components while keeping the respective sub current source terms intact.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for estimating power supply noise of a power distribution network (PDN) of a circuit design, comprising:
providing a symbolic PDN map including at least a first mesh that includes a plurality of map nodes, wherein each map node of the first mesh corresponds to a node of the circuit design;
modeling at least one parasitic component that is provided on a branch of the symbolic PDN map and a pair of current sources that are provided at two respective map nodes of the symbolic PDN map;
providing a matrix equation based on an interrelated conduction behavior among the parasitic component and the pair of current sources, wherein the matrix equation includes a current source term representing the pair of current sources and an unknown variable term representing a voltage level of at least one map node of the symbolic PDN map; and
based on the matrix equation, expanding the unknown variable term in a frequency-domain as a sum of plural mathematical components while keeping the current source term intact, thereby determining the voltage level of the at least one map node of the symbolic PDN map, wherein the voltage level is indicative of a power supply noise of the PDN of the circuit design.

2. The method of claim 1, further comprising:
approximating the sum of plural mathematical components as a mathematical fraction comprising a numerator polynomial series and a denominator polynomial series while keeping the current source term intact; and
converting the approximated sum together with the intact current source term into a time-domain to estimate a voltage level at each of the map nodes over the symbolic PDN map.

3. The method of claim 1, wherein the parasitic component of the symbolic PDN map corresponds to a parasitic resistor, a parasitic capacitor, or a parasitic inductor present in the PDN of the circuit design.

4. The method of claim 1, wherein the pair of current sources correspond to an ideal supply voltage and a circuit in the circuit design, respectively.

5. The method of claim 4, wherein the ideal supply voltage is either a positive supply voltage or a ground voltage of the circuit design.

6. The method of claim 1, wherein the first mesh corresponds to a positive supply voltage network of the PDN of the circuit design.

7. The method of claim 1, wherein the symbolic PDN map further comprises a second mesh comprising a plurality of map nodes, and each map node of the second mesh corresponds to a node of the circuit design.

8. The method of claim 7, wherein the second mesh corresponds to a ground voltage network of the PDN of the circuit design.

9. A system for estimating power supply noise of a power distribution network (PDN) of a circuit design, comprising:
a memory storing computer-executable instructions; and
one or more hardware processors coupled to the memory are configured to:
provide a symbolic PDN map including at least a first mesh that includes a plurality of map nodes, wherein each map node of the first mesh corresponds to a node of the circuit design;
model at least one parasitic component that is provided on a branch of the symbolic PDN map and a pair of current sources that are provided at two respective map nodes of the symbolic PDN map;
provide a matrix equation based on an interrelated conduction behavior among the parasitic component and the pair of current sources, wherein the matrix equation includes a current source term representing the pair of current sources and an unknown variable term representing a voltage level of at least one map node of the symbolic PDN map; and
based on the matrix equation, expand the unknown variable term in a frequency-domain as a sum of plural mathematical components while keeping the current source term intact, thereby determining the voltage level of the at least one map node of the symbolic PDN map, wherein the voltage level is indicative of a power supply noise of the PDN of the circuit design.

10. The system of claim 9, wherein the one or more hardware processors are further configured to:

approximate the sum of plural mathematical components as a mathematical fraction comprising a numerator polynomial series and a denominator polynomial series while keeping the current source term intact; and convert the approximated sum together with the intact current source term into a time-domain to estimate a voltage level at each of the map nodes over the symbolic PDN map.

11. The system of claim 9, wherein the parasitic component of the symbolic PDN map corresponds to a parasitic resistor, a parasitic capacitor, or a parasitic inductor present in the PDN of the circuit design.

12. The system of claim 9, wherein the pair of current sources correspond to an ideal supply voltage and a circuit in the circuit design, respectively.

13. The system of claim 12, wherein the ideal supply voltage is either a positive supply voltage or a ground voltage of the circuit design.

14. The system of claim 9, wherein the first mesh corresponds to a positive supply voltage network of the PDN of the circuit design.

15. The system of claim 9, wherein the symbolic PDN map further comprises a second mesh comprising a plurality of map nodes, and each map node of the second mesh corresponds to a node of the circuit design.

16. The system of claim 15, wherein the second mesh corresponds to a ground voltage network of the PDN of the circuit design.

17. A method for estimating power supply noise of a power distribution network (PDN) of a circuit design, comprising:

providing a symbolic PDN map including at least a first mesh that includes a plurality of map nodes, wherein each map node of the first mesh corresponds to a node of the circuit design;

modeling at least one parasitic component that is provided on a branch of the symbolic PDN map, and first, second, and third current sources that are respectively provided at three different map nodes of the symbolic PDN map;

providing a matrix equation based on an interrelated conduction behavior among the parasitic component and the first, second, and third current sources, wherein the matrix equation includes an unknown variable term representing a voltage level of at least one map node of the symbolic PDN map, and a current source term comprising representing the first, second, and third current sources;

splitting the current source term into two sub current source terms thereby proving two sub matrix equations with a respective unknown variable term; and based on the respective sub matrix equations, expanding the respective unknown variable terms in a frequency-domain as a first sum of plural mathematical components and a second sum of plural mathematical components while keeping the respective sub current source terms intact, thereby determining the voltage level of the at least one map node of the symbolic PDN map, wherein the voltage level is indicative of a power supply noise of the PDN of the circuit design.

18. The method of claim 17, wherein a first sub current source term corresponds to the first and second current sources, and a second current source term corresponds to the first and third current sources.

19. The method of claim 17, further comprising:

approximating the first sum as a first mathematical fraction comprising a numerator polynomial series and a denominator polynomial series while keeping the respective sub current source term intact, and approximating the second sum as a second mathematical fraction comprising a numerator polynomial series and a denominator polynomial series while keeping the respective sub current source term intact;

converting the approximated first sum together with the respective sub current source term into a time-domain to estimate a first voltage level at each of the map nodes over the symbolic PDN map, and the approximated second sum together with the respective sub current source term into a time-domain to estimate a second voltage level at each of the map nodes over the symbolic PDN map; and superimposing the first and second voltage levels at each of the map nodes over the symbolic PDN map to estimate an overall voltage level at each respective map node.

20. The method of claim 17, wherein the first current source corresponds to an ideal supply voltage in the circuit design, the second and third current sources correspond to two respective circuits in the circuit design, and wherein the ideal supply voltage is either a positive supply voltage or a ground voltage of the circuit design.

* * * * *